United States Patent [19]
Lin

[11] Patent Number: 6,127,755
[45] Date of Patent: Oct. 3, 2000

[54] MOTOR AND END FRAME THEREFOR FOR MACHINE OF PUMP APPLICATIONS AND METHOD OF ASSEMBLING SAME

[75] Inventor: Chih M. Lin, Tipp City, Ohio

[73] Assignee: A. O. Smith Corporation, Milwaukee, Wis.

[21] Appl. No.: 09/428,188

[22] Filed: Oct. 27, 1999

Related U.S. Application Data

[62] Division of application No. 09/054,119, Apr. 2, 1998, abandoned.

[51] Int. Cl.[7] .............................. H02K 5/00; H02K 15/00
[52] U.S. Cl. .................................. 310/89; 310/42; 29/596
[58] Field of Search .......................... 310/89, 42; 174/50; 361/600, 601; 324/156; 335/278; 336/90; 29/596

[56] References Cited

U.S. PATENT DOCUMENTS

| | | | |
|---|---|---|---|
| 4,032,806 | 6/1977 | Seely | 310/50 |
| 4,306,168 | 12/1981 | Peachee | 310/217 |
| 4,361,953 | 12/1982 | Peachee | 29/596 |
| 4,631,807 | 12/1986 | Kawada et al. | 29/598 |
| 4,801,833 | 1/1989 | Dye | 310/239 |
| 4,900,967 | 2/1990 | Amano et al. | 310/239 |
| 4,931,683 | 6/1990 | Gleixner et al. | 310/89 |
| 4,961,016 | 10/1990 | Peng et al. | 310/62 |
| 5,061,869 | 10/1991 | Stewart, Sr. | 310/89 |
| 5,380,031 | 1/1995 | Vitali et al. | 280/611 |
| 5,391,837 | 2/1995 | Carey | 174/50 |
| 5,872,414 | 2/1999 | Iijima | 310/89 |

*Primary Examiner*—Nick Ponomarenko
*Assistant Examiner*—Dang Dinh Le
*Attorney, Agent, or Firm*—Michael Best & Friedrich LLP

[57] ABSTRACT

A method of assembling a motor and pump assembly. The machine or pump assembly includes an electric motor having a housing, an end frame and a bolt extending through the housing and the end frame to secure the housing and the end frame together. The end frame includes a through-bore having an inner diameter. The bolt has a major diameter that is greater than the inner diameter of the through-bore so that when the bolt is turned into the through-bore, the bolt creates threads in the through-bore of the end frame. When the electric motor is placed next to the housing, the bolt is turned to strip the threads in the through-bore and screw the bolt into the housing of the pump apparatus.

7 Claims, 2 Drawing Sheets

MOTOR AND END FRAME THEREFOR FOR MACHINE OF PUMP APPLICATIONS AND METHOD OF ASSEMBLING SAME

RELATED APPLICATION

This patent application is a divisional application claiming priority to U.S. patent application Ser. No. 09/054,119, filed Apr. 2, 1998 now abandoned.

BACKGROUND OF THE INVENTION

The invention relates to electric motors, and particularly, to electric motors for use in applications where the motor is installed in a machine or pump assembly.

Typically, an electric motor includes a housing supporting a generally cylindrical stator. The housing typically includes opposite ends and an end frame is mounted on each of the ends by a plurality of bolts extending through one end frame, through the housing and through the opposite end frame. Nuts are threaded onto the threaded ends of the bolts to secure the assembly together. The electric motor also typically includes a rotor shaft supported by the end frames. A rotor is mounted on the rotor shaft internal to the housing. Such a motor has many different applications including use of the motor to drive various machines including fluid pumps, fans or impellers.

SUMMARY OF THE INVENTION

When using the electric motor of the prior art in a machine or a pump application, the nuts that are threaded onto the bolts to secure the assembly together are removed and the bolts are then threaded directly into the machine assembly to secure the motor to the unit. The removal of the nuts requires a significant amount of labor. Additionally, the nuts are usually discarded as waste.

Accordingly, it is an advantage to provide an electric motor for easy installation in machine or pump assemblies. The electric motor has an end frame including through-bores having an inner diameter narrower than the major diameter of the bolts extending through the housing. The end frame is made of a material that is softer than the material from which the bolts are made. In initial assembly, the bolts (preferably steel) are gently threaded into the end frame (preferably aluminum) to secure the end frame to the motor housing during shipping. The engagement of the harder material bolt threads with the smaller diameter through-bore of the "less hard" end frame causes the bolt to "self-tap" threads in the through-bore.

When the electric motor is ready to be secured to the machine or pump assembly, the bolts are simply threaded through the end frame through-bores, thereby stripping the threads in the end frame and through-bore and threading the bolt into the machine or pump assembly.

It is a principal advantage of the invention to provide an electric motor to be integrated into an assembly without any disassembly of the motor apparatus or waste of materials.

It is another advantage of the invention to provide an electric motor for a machine or pump application wherein the motor has an end frame made of a metal that is softer than the bolt securing the end frame to the motor housing.

Other features and advantages of the invention are set forth in the following detailed description, drawings and claims.

Figure 1:
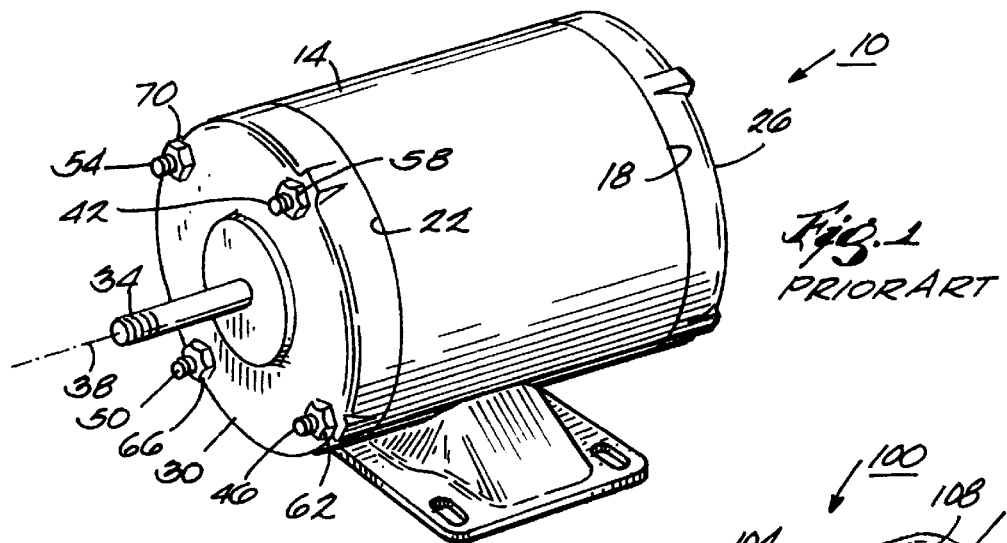
FIG. 1 is a perspective view of an electric motor of the prior art.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

FIG. 1 of the drawings illustrates an electric motor 10 for a machine or pump application of the prior art. As shown in FIG. 1, the prior art electric motor 10 includes a housing 14 having opposite ends 18 and 22, and a pair of end frames 26 and 30 mounted on the ends 18 and 22, respectively. The end frames 26 and 30 include bearings (not shown) for supporting a rotor shaft 34 for rotation about an axis 38. A rotor (not shown) is mounted on the rotor shaft 34 internal to the electric motor housing 14. A plurality of bolts 42, 46, 50 and 54 extend through the end frame 26, the housing 14, and the end frame 30; and a plurality of nuts 58, 62, 66 and 70 are mounted on the bolts 42, 46, 50 and 54, respectively, to secure the end frames 26 and 30 to the housing 14. In order to connect the prior art motor 10 to a machine or pump apparatus (not shown in FIG. 1), it is first necessary to remove and discard the nuts 58, 62, 66 and 70, and, while holding the electric motor assembly together to prevent it from falling apart, position the motor on the machine or pump assembly and screw the bolts 42, 46, 50, and 54 into the machine or pump assembly to secure the electric motor 10 to the machine or pump assembly.

Figure 2:
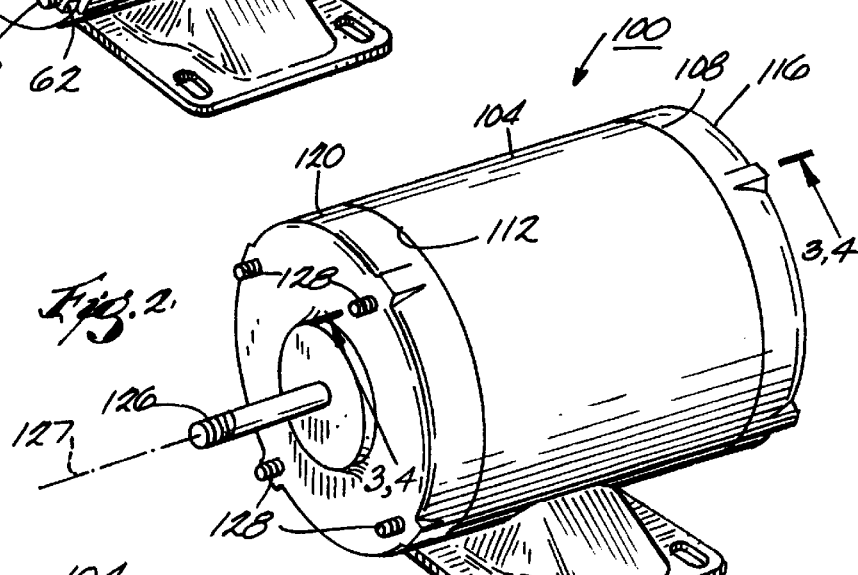
FIG. 2 is a perspective view of an electric motor for a machine or pump application embodying the invention.
Figure 3:
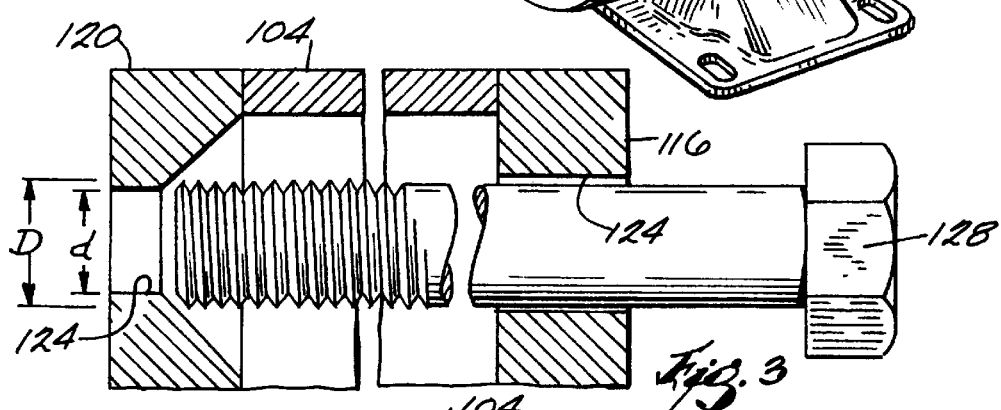
FIG. 3 is a partial, cross-section taken along line 3—3 in FIG. 2 before the bolt is threaded into the end frame.
Figure 4:
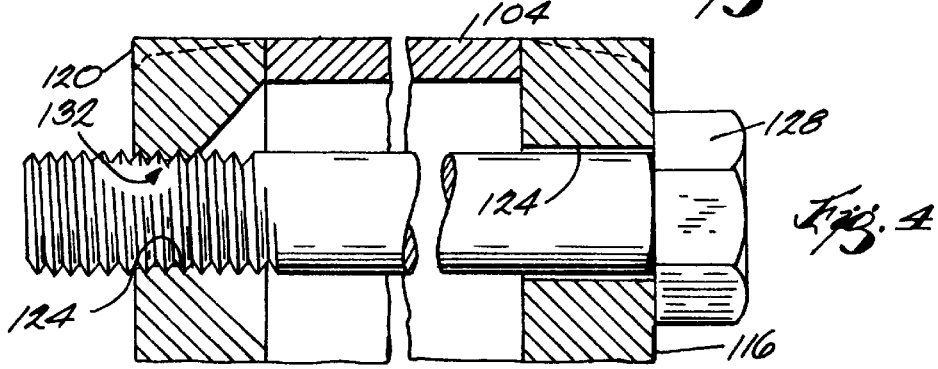
FIG. 4 is a partial cross-section taken along line 4—4 in FIG. 2.
Figure 5:
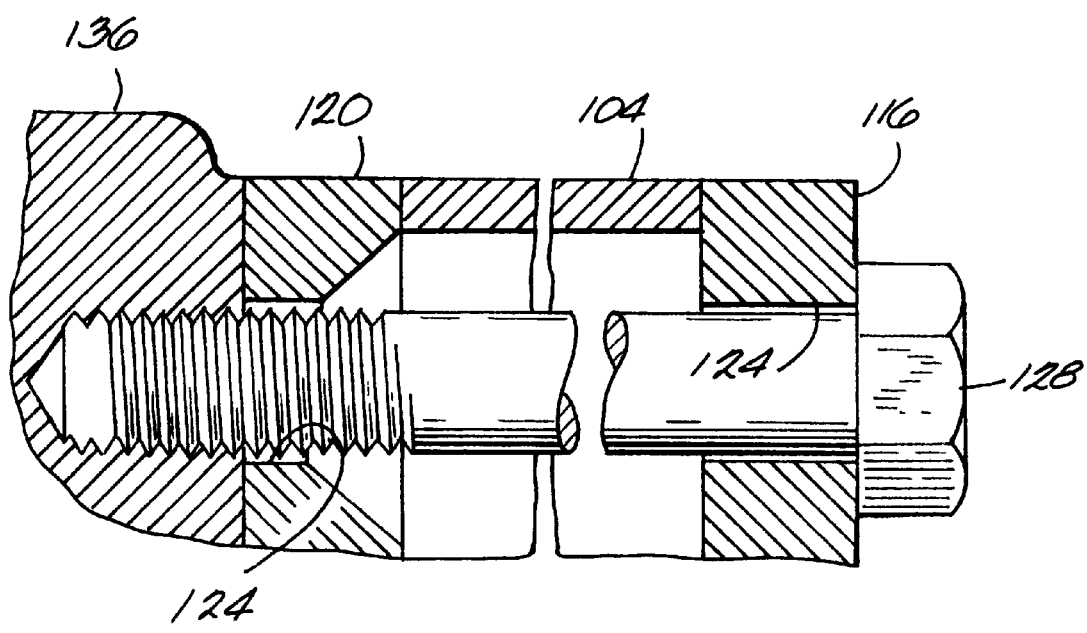
FIG. 5 is a partial cross-section similar to FIG. 4 but showing the bolt threaded into the machine or pump apparatus thereby stripping the threads in the end frame.

FIG. 2 illustrates an electric motor 100 embodying the invention. The electric motor 100 includes a generally cylindrical housing 104 having opposite ends 108 and 112. A pair of end frames 116 and 120 are mounted on the ends 108 and 112, respectively. Each end frame includes four through-bores 124 (only two of which are shown in cross-section in FIGS. 3–5). As shown in FIG. 3, the through-bores 124 have an inner diameter "d".

The motor 100 also includes a rotor shaft 126 mounted in the housing 104. The rotor shaft 126 is supported for rotation about an axis 127 by bearings (not shown) in end frames 116 and 120. A rotor (not shown) is mounted on the rotor shaft internal to the housing 104.

The electric motor 100 also includes four threaded connectors 128 for securing the end frames 116 and 120 to the motor housing 104. While any known threaded connectors are appropriate, the threaded connectors 128 shown in the drawings are bolts. As shown in FIG. 3, the bolts 128 include a major or outer diameter "D" that is greater than the inner diameter "d" of the through-bores 124. The bolts 128 are made of a material that is harder than the material forming the end frames 116 and 120. While many different metal or non-metal materials may be appropriate for either the bolts 128 or the end frames 116 and 120, the end frames 116 and 120 of the motor 100 are made of aluminum or an aluminum alloy, and the bolts 128 are made of steel. The bolts 128 extend through the end frame 116, the housing 104, and are threaded into the through-bores 124 of the end frame 120 to secure the end frames 116 and 120 to the housing 104.

During initial assembly of the motor 100, the rotor shaft 126 is positioned within the housing 104. End frames 116 and 120 are then connected to the ends 108 and 112, respectively. Bolts 128 are inserted into the through-bores 124 of end frame 116, through the housing 104 and are threaded into the through-bores 124 of end frame 120. Threading the large diameter bolts 128 into the smaller diameter through-bores 124 of end frame 120 causes the bolts 128 to "self-tap" threads 132 into the through-bores 124 of end frame 120, thereby securing the end frames 116 and 120 to the housing 104 without the use of nuts or other hardware required in the prior art.

When it is desired to connect the electric motor 100 to a machine or pump apparatus 136 (FIG. 5 only), the electric motor 100 is positioned adjacent the machine 136 and the bolts 128 are torqued through the end frame 120 thereby stripping the threads 132 in through-bores 124 and threading the bolts 128 into the machine 136 to secure the electric motor 100 to the machine 136. The ability to secure the motor 100 to the machine 136 without removing any unneeded parts, such as nuts or other hardware, eliminates the waste of materials, and reduces the amount of labor required to build the machine 136.

Various features and advantages of the invention are set forth in the following claims.

What is claimed is:

1. A method of assembling a motor apparatus, said method comprising:

providing an electric motor having a housing, and an end frame mounted on said housing and defining a through-bore;

providing a threaded connector;

threading said threaded connector through a portion of said housing and into said through-bore of said end frame to thereby tap threads into said through-bore and secure said end frame to said housing;

positioning said electric motor adjacent a machine; and threading said threaded connector into said machine thereby stripping the threads in said through-bore of said end frame and securing said electric motor to said machine.

2. A method as set forth in claim 1, wherein said end frame is made from a material having a first hardness and said threaded connector is made from a material having a second hardness, and wherein said second hardness is greater that said first hardness.

3. A method as set forth in claim 1, wherein said end frame is aluminum and wherein said threaded connector is steel.

4. A method of assembling a machine assembly, said method comprising:

providing an electric motor having a housing, and an end frame mounted on said housing, said end frame defining a through-bore and being made of a material having a first hardness;

providing a threaded connector having a second hardness greater than said first hardness;

threading said threaded connector through a portion of said housing and into said through-bore of said end frame to thereby tap threads into said through-bore and secure said end frame to said housing;

positioning said electric motor adjacent a machine; and screwing said threaded connector into said machine thereby stripping the threads in said through-bore of said end frame and securing said electric motor to said machine.

5. A method as set forth in claim 4, wherein said end frame is aluminum and wherein said threaded connector is steel.

6. A method of assembling a motor and pump assembly, said method comprising:

providing an electric motor having a housing, and an end frame mounted on said housing, said end frame defining a through-bore and being made of a material having a first hardness;

providing a threaded connector having a second hardness greater than said first hardness;

threading said threaded connector through a portion of said housing and into said through-bore of said end frame to thereby tap threads into said through-bore, and such that a portion of said connector extends out of said end frame;

positioning said electric motor adjacent a pump; and screwing the portion of said threaded connector extending out of said end frame into said pump, thereby stripping the threads in said through-bore of said end frame and securing said electric motor to said pump.

7. A method as set forth in claim 6, wherein said end frame is aluminum and wherein said threaded connector is steel.

\* \* \* \* \*

UNITED STATES PATENT AND TRADEMARK OFFICE
CERTIFICATE OF CORRECTION

PATENT NO : 6,127,755
DATED : October 3, 2000
INVENTOR(S): Chin M. Lin

It is certified that error appears in the above-identified patent and that said Letters Patent are hereby corrected as shown below:

On the face of the patent at [54], in the title, after "MACHINE" and before "PUMP" delete "OF" and insert --OR--.

Column 1, line 2, after "MACHINE" and before "PUMP" delete "OF" and insert --OR--.

Signed and Sealed this

First Day of May, 2001

Attest:

NICHOLAS P. GODICI

*Attesting Officer*       *Acting Director of the United States Patent and Trademark Office*